US006757612B1

United States Patent
Talent et al.

(10) Patent No.: US 6,757,612 B1
(45) Date of Patent: Jun. 29, 2004

(54) PHENOMENOLOGICAL ORBITAL DEBRIS IMPACT RISK ASSESSMENT MODEL AND SOFTWARE

(75) Inventors: David L. Talent, Houston, TX (US); Ken C. K. Cheung, Kailua, HI (US); Daron L. Nishimoto, Kula, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

(21) Appl. No.: 10/189,381

(22) Filed: Jul. 8, 2002

Related U.S. Application Data

(60) Provisional application No. 60/303,082, filed on Jul. 6, 2001.

(51) Int. Cl.[7] .............................................. G06F 19/00
(52) U.S. Cl. .............................................. 702/2; 702/3
(58) Field of Search ....................... 702/2, 3, 4; 342/26; 244/158 R

(56) References Cited

U.S. PATENT DOCUMENTS

| | | | | |
|---|---|---|---|---|
| 5,082,211 A | * | 1/1992 | Werka ..................... | 244/158 R |
| 5,405,108 A | * | 4/1995 | Marin et al. ............. | 244/158 R |
| 5,421,540 A | * | 6/1995 | Ting ......................... | 244/163 |
| 5,512,743 A | * | 4/1996 | Shaffer et al. ........... | 250/203.6 |
| 6,050,525 A | * | 4/2000 | Drake ...................... | 244/158 R |
| 6,102,334 A | * | 8/2000 | Claffey et al. .......... | 244/158 R |
| 6,124,825 A | * | 9/2000 | Eschenbach ............. | 342/357.08 |
| 6,491,258 B1 | * | 12/2002 | Boyd et al. .............. | 244/158 R |

OTHER PUBLICATIONS

Talent, D. L.; *Analytic Model for Orbital Debris Environmental Management;* Journal of Spacecraft and Rockets, vol. 29, No. 4; Jul.–Aug. 1992; pp. 508–513.

Mendell et al.; *Telecommunications Satellite Constellations and the LEO Debris Population;* 48th International Astronautical Conference; Turin, Italy; Oct. 6–10, 1997; 8 pages.

* cited by examiner

Primary Examiner—Marc S. Hoff
Assistant Examiner—Anthony Gutierrez
(74) Attorney, Agent, or Firm—James Creighton Wray; Meera P. Narasimhan

(57) ABSTRACT

An orbital debris impact risk assessment and management model is provided for low-Earth orbit (LEO). The model is phenomenologically based, meaning real, theoretical and historical data of the LEO environment is used in conjunction with thermodynamic based code architecture to perform impact risk assessments. The format of the model is developed such that user friendliness and user adaptability are maximized. The model can be used as a stand-alone program (software) or run over the World-Wide Web as an application service provider (ASP). The model may be used to examine trends in the evolution of the LEO environment or to calculate likelihood of impacts for specific on-orbit assets or groups of assets.

9 Claims, 2 Drawing Sheets

PHENOMENOLOGICAL ORBITAL DEBRIS IMPACT RISK ASSESSMENT MODEL AND SOFTWARE

This application claims the benefit of U.S. provisional application Serial No. 60/303,082 filed Jul. 6, 2001.

BACKGROUND OF THE INVENTION

A fundamental characteristic of mankind's use of the low-Earth-orbit (LEO) environment is that devices placed there usually result in the generation of orbital debris as a by-product. When payloads are launched, operational debris pieces and rocket bodies are also often placed in the environment. In some cases, these objects have not remained on orbit as inert hulks; spontaneous disintegrations have often replaced a single large piece of debris piece with up to hundreds of smaller pieces. In fact, approximately 50% of all objects currently tracked were generated by fragmentations of one type or another.

Even payloads themselves tend first to become derelicts before they decay from the environment; presently approximately four out of every five such objects are useless hazards to navigation. From this it may be concluded that the average orbital life of the typical payload is, at least, several times greater than its functional life. Finally, although not yet a significant contributor to the buildup of debris in the LEO environment, collisions may become more frequent as the environment becomes increasingly crowded.

Taken together, approximately 95% of all mass in LEO is trash, and a host of smaller, yet dangerous, objects are suspected to be present. With the exception of very few cases of retrieval (e.g., Long Duration Exposure Facility, or LDEF), the only debris removal mechanism operating in the environment is drag due to the residual atmosphere at LEO altitudes. Even this mechanism was shown to be ineffective above an altitude of 750 km.

Since the continued use of the LEO environment is assured during the upcoming era of International Space Station (ISS) and the anticipated proliferation of LEO constellations of communication satellites (comsat), navigation satellites and other high-value systems, a present desideratum would be the development of methods to assess the impact of mankind's activities on the environment and, in turn, the impact of the evolving environment on mankind's further use. Presumably, if successful in this pursuit, the user community will be able to determine, with sufficient lead-time, what activities and policies are most likely to lead to a stable and desirable environment in the long term. In addition to large-scale LEO debris environment issues, predictive risk assessment models are urgently needed relative to high-value assets, whether individual in nature (e.g., ISS) or operational collectives (e.g., comsat constellations).

The utilization of space is increasing as commercial, military, government, research, and academic agencies discover new ways to exploit the use of this environment. With the increase in the numbers of satellites and debris orbiting Earth comes the increase in importance of protecting the safety of manned and unmanned space-based assets. This explosive growth rate is expected to increase with the deployment of large satellite constellations, both military and commercial. The advent of large low-Earth-orbit (LEO) satellite constellations presents a significant new issue for the orbital-debris environment; this presence of large numbers of commercial satellites is a new phenomenon for modelers of space debris.

Policies, specifically NASA Management Instruction 1700.8 and the Department of Defense Space Policy, dictate NASA and Department of Defense space-faring agencies to strive to minimize or reduce accumulation of space debris consistent with mission requirements and costs. All commercial activities are subject to the Department of Transportation (DOT) Office of Commercial Space Transportation's regulations requiring them to address safety issues with respect to launches, including the risks associated with orbital debris and on-orbit proliferation.

Results of the National Science and Technology Council Committee on Transportation Research and Development Interagency Report on Orbital Debris (1995) concluded:

"There is a need to characterize the orbital debris environment, even when observations are not practical, such as when the size or altitude of objects makes measurements difficult. Modeling, then, is required to combine existing measurements and theory in such a way that predictions can be made. Several types of models are required to make these predictions:

(1) A model to describe future launches, the amount of debris resulting from these launches, and the frequency of accidental or intentional explosions in orbit (traffic model).

(2) A model to describe the number of fragments, fragment size, and velocity distribution of ejected fragments resulting from a satellite explosion or collision (breakup models).

(3) A model which will make long-term predictions of how debris orbits will change with time (propagation model).

(4) A model which predicts collision probabilities for spacecraft (flux or risk model).

(5) A model which predicts hazards in the near term from a breakup event.

SUMMARY OF THE INVENTION

The Particle-in-a-Box (PIB) model of the present invention was developed specifically to address concerns (1) through (5) stated above. Results show the model provides an effective predictive tool to address the above concerns. A concluding recommendation of the interagency report stated that NASA and Department of Defense should continue current activities in orbital-debris research with particular attention to those orbits where critical national security payloads may be located, including International Space (ISS) and telecommunication constellations. This PIB model accomplishes this task with a limited object-size resolution. Recommendations also stressed the importance of focused studies on debris and emerging LEO systems. This invention provides a commercially available user-friendly space environment modeling package much needed by government agencies and commercial entities to address these policies and requirements.

The original PIB model was a single-particle, single-stratum averaged treatment of LEO, capable of global evolutionary and stability analysis. Without sacrificing its capabilities, the model resolution is increased by more than an order of magnitude from the original PIB model, resulting in substantial pay-off. The increased ability of the model to accept detailed phenomenological data represents a quantum leap in modeling applicability, as was shown by analysis of impact-risk-assessment studies of high-value assets such as the International Space Station and constellation, with cataloged objects (40 centimeter objects and larger).

An exemplary embodiment addresses impact risks significant for all space-based assets, including astronauts on extra-vehicular activity (EVA). This increase in fidelity improves the global (evolutionary and stability) analysis, which the PIB was originally developed to perform.

In developing a mathematical model of any evolving system, one must first choose a relevant parameter as the "state" quantity. In developing the current model, the number of objects resident in the LEO environment at any given time was selected. The primary reason for this choice is that if an object can be seen, it can be counted—the number of objects on orbit is a direct observable subject, of course, to an appreciation of possible incompleteness, especially at higher altitudes and smaller sizes. The basic equation of the model is presented as follows:

$$\dot{N} = A + BN + CN^2 \qquad (1)$$

Where: N=number of objects on orbit $\dot{N}$=time rate of change of the number of objects A=deposition coefficient B=removal coefficient C=collision coefficient The form of the equation follows from the assumptions that: (1) deposition reflects the rate at which users of the LEO environment choose to populate it with new objects; (2) decay due to atmospheric drag and/or random (debris sweeper) removal may be represented as a finite probability per unit time of the decay of any given LEO object; and (3) the theory for collisions between members of the population may be developed along a line of reasoning similar to that for collisions between particles in a gas whose mean free paths between collisions may be calculated. Each of these coefficients will be described in turn with clear illumination of their phenomenological character.

Deposition Coefficient

It is a historical fact that objects are launched into the LEO environment and that examination of the available data (e.g., NASA Satellite Situation Reports) will reveal that it is not unusual, on the average, for more than one object to be placed in LEO per launch. This activity deposits objects, mass and collision "target" area on orbit. Launch activity is a planned, intelligent activity and the typical number of objects deployed per launch is a reflection of policies, procedures and mission requirements.

Furthermore, it has been observed that some objects, initially intact, later fragment on orbit. As a result of such accidents, no additional mass on orbit results; however, the environment is reduced by one large object and its cross-sectional area, only to be replaced by a large number of smaller objects and their net target area. Although not planned, the rate of fragmentation is a direct result of human activity and is included here with the "intelligent" deposition of objects in the LEO regime.

Finally, the capability to retrieve objects has been demonstrated (e.g., LDEF) and has also been discussed as a possible mode of debris reduction. This component of the deposition term is negative.

In general, in the baseline model being described here, the base of LEO is taken to be that altitude at which an average member of the population has only one year left on orbit. Furthermore, only objects deposited on orbit at an altitude greater than this base and remaining there for at least one year are counted as members of the environment—hereafter this requirement will simply be referred to as the "membership condition." With these provisions in mind, the expression for A is as follows:

$$A = L[(P1)(D1) + (FE)(DE)(PE)] - REM \qquad (2)$$

Where: L=launches per year, worldwide

P1=average number of pieces per launch

D1=fraction of P1 meeting membership conditions

FE=fraction of launches resulting in an on-orbit fragmentation

DE=fraction of FE meeting membership conditions

PE=average number of fragments produced per explosion

REM=number of objects retrieved per year from LEO

Removal Coefficient

In the absence of a retarding medium, all objects in LEO would remain on orbit for an indefinite period of time. However, the residual atmosphere is sufficient to cause the eventual decay and reentry of some objects in this region. The efficiency of this mechanism to remove objects from orbit is dependent on the object's altitude, orbital and physical characteristics, the phase of the solar cycle, and so on. Other factors being equal, small objects tend to be more susceptible to the action of drag forces by virtue of their (typically) larger area-to-mass ratios. In addition, the possibility of using orbital debris "sweepers" or some equivalent process for cleaning up the orbital debris environment has been discussed.

It is assumed that some device or system is possible that may be employed to remove debris objects of all sizes, with the same efficiency, and regardless of their inherent drag characteristics. For example, such a system, when deployed, might sweep up 1% of all orbital debris objects per year. Taken together with natural decay, the B term is written as follow:

$$B = [Batm + S] \qquad (3)$$

Where: Batm=reduction fraction per year due to natural drag

S=reduction fraction per year due to use of debris sweeper system of some type

Collision Coefficient

To determine the number of objects created per unit time due to collision, the C term is expressed as the product of two quantities shown here as follows:

$$C = (\delta) H_{11} \qquad (4)$$

Where: $\delta$=number of pieces produced as a result of a collision less the two destroyed $H_{11}$=collision frequency (yr$^{-1}$) between members of a population of similar objects The collision product factor $\delta$ is obtainable from a sufficient base of experimental data or from theory. We will take $\delta$ to be a constant in this simplest possible model of the environment where the population, at all times, is assumed to be made up of equivalent particles whose characteristics, overall, may change as a function of time. (A more sophisticated treatment of collision products could be allowed for if the population were partitioned into a number of different particle size regimes as will be discussed below.)

The $H_{11}$ term is developed along a line of reasoning similar to that of the kinetic theory of gasses as is expressed for members of a population of similar objects as follows:

$$H_{11} = (F_v)\left[\frac{(\sqrt{2}\,V_c)D_1^2}{(4/3)(R_T^3 - R_B^3)}\right]\left(\frac{1 - 1/N_1}{2}\right) \quad (5)$$

Where: $H_{11}$=collision frequency (yr-1) between members of a population of similar objects $F_v$=incomplete mixing factor
$V_c$=orbital speed at average population altitude
$D_1$=average population object diameter
$R_T$=radius of the top of LEO shell from the Earth's center
$R_B$=radius of the base of LEO shell from the Earth's center Strictly speaking, the expression in Equation (5) is valid only for objects free to move at random in the specified volume like a gas. Also implicit in this formulation is the assumption that the orientation of the velocity vector of one particle with respect to all others is completely at random. It is clear that neither of these conditions is completely realized for orbital debris pieces in LEO.

The $$\sqrt{2}\,V_c$$

term, for a typical LEO orbit speed, yields about 10 km/sec. However, the assumption implicit in (5) that every particle has access to all parts of the LEO volume cannot possibly be correct. The $F_v$ term, however, is a tool whereby a phenomenological correction may be applied. An examination of orbital eccentricities is required to calculate $F_v$. Alternatively, one could determine $F_v$ empirically by comparing the predicted collisions arising out of an assumption of $F_v=1.0$ with the actual number of collisions (if any) to date which would imply a value for $F_v$ less than 1.0.

In a fashion similar to fragmentations, a collision between two objects results in the reduction of the total number of objects in LEO by two, along with their contribution to the total cross-sectional area for collisions. This reduction is more than compensated by the addition of the combined cross-sectional area of all of the fragments and a net increase in the total number of (smaller) objects.

The implementation of the expansion of the model to more particle sizes is straightforward, and Equation (1) extended to the case of a single stratum containing 3 species of particles (for example) is as follows:

$$N_k = A_k + B_k N_k + \sum_{i=1}^{3}\sum_{j=1}^{3} \delta_{(ij)k} H_{ij} N_i N_j \quad (6)$$

where the index k may take on values from 1 to N (3 for this case). Regarding the $H_{ij}$ factor, Equation (5) is appropriate if i=j; for dissimilar objects the appropriate form is as follows:

$$H_{ij} = (F_{v_{ij}})\left\{\frac{(\sqrt{2}\,V_c)[D_i + D_1]/2]^2}{(4/3)(R_T^3 - R_B^3)}\right\} \quad (7)$$

All variables in Equations (6) and (7) are defined in fashions analogous to Equations (1) and (5). Collisions between two objects, in general, result in a decrease in the number of large objects while increasing the number of small objects such that mass conservation is maintained.

The model is implemented by the numerical solution of the set of coupled differential equations described by equations (6) and (7), for the most general case of multiple debris sizes and multiple strata. The solution of the equation set may be accomplished using standard differential equation solvers such as Euler methods or Runge-Kutta procedures. The following includes, but is not limited to, the capabilities of the model:

1. Environmental evolution—near term and long term
2. Modeling of solar effects on the environment
3. Environment response to policy implementation and mitigation
   Launch rate variation
   Operational debris limitation
   Procedures to limit explosions and breakups
   Efficacy of collision-avoidance procedures
4. Mitigation
   Large debris removal (rocket bodies)
   Small debris removal (sweepers, laser removal, etc.)
5. Environment response to catastrophe
   Explosion and Breakups
   Sabotage & Warfare
6. High-value-asset concerns
   International Space Station risk assessment against nominal and special environments
   Constellation risk assessment against nominal and special environments
   Cumulative exposure risk to astronauts on EVA
   Other individual or group assets (satellite, space telescope, space laboratory, etc.)
   Asset risk assessment based on collision rate
      Collision rate—nominal
      Collision rate—temporary elevation due to nearby explosions and breakups
   Use of risk assessment to calculate insurance for high-value assets The technology can be used as a stand-alone software package or via the Internet as an application service provider (ASP) service. For sophisticated applications, the program can be implemented by an expert group performing as consultants.

These and further and other objects and features of the invention are apparent in the disclosure, which includes the above and ongoing written specification, with the claims and the drawings.

DETAILED DESCRIPTION OF THE PREFERRED EMBODIMENTS

The original PIB model considered the entire LEO environment as one grand averaged regime—the "box" for the "particles" in the box, with an average particle size characterizing the entire debris population. This initial stage of modeling, although crude, was sufficient for its immediate purpose, which was to provide insight into the global evolution and stability of the LEO debris environment. To significantly increase the capabilities of the model, it was necessary to extend the technique into multiple-particle-size and multiple-stratum analysis.

One embodiment implements three discrete particle sizes into the PIB code, replacing one average particle-size class. This increased modeling resolution allows for more efficient utilization of available phenomenological data. As one example, different particle sizes have different drag characteristics determined by appropriate analysis of existing historical observational data; in general, smaller objects have higher area-to-mass ratios and are thus more susceptible to drag. Fragmentations and interactions between particles of all sizes (i.e., collisions) reduce the number of larger objects, replaced by a growing number of smaller objects (i.e., "grinding" down of large objects). The multiple-size model implemented in a single stratum environment facilitates code development, trend verification, troubleshooting and phenomenology implementation.

In this embodiment, the LEO environment is divided into three strata, each with the ability to accept phenomenology unique to the stratum. The most prominent change found between strata is the effect of the residual atmosphere in reducing, or dragging out, objects; this effect is substantially greater in the lowest stratum and has dramatic implications as to the long-term stability of higher strata. Instability at the higher strata can flow down to and infect lower strata through residual drag and other cross-feed interactions. These cross-feed interactions—drag, fragmentations and collisions—cause objects to transition to neighboring strata as well as leave the environment altogether (leakage).

The multiple-size and multiple stratum codes were combined into one complete melded model. In essence, each particle size class in each stratum is tracked independently, but with interactions between objects and transport across strata possible through various mechanisms, each modeled after historical phenomenology. This major modeling step constitutes an order-of-magnitude (approximately a factor of 40) increase in resolution and code complexity as compared to the original PIB.

Figure 1:
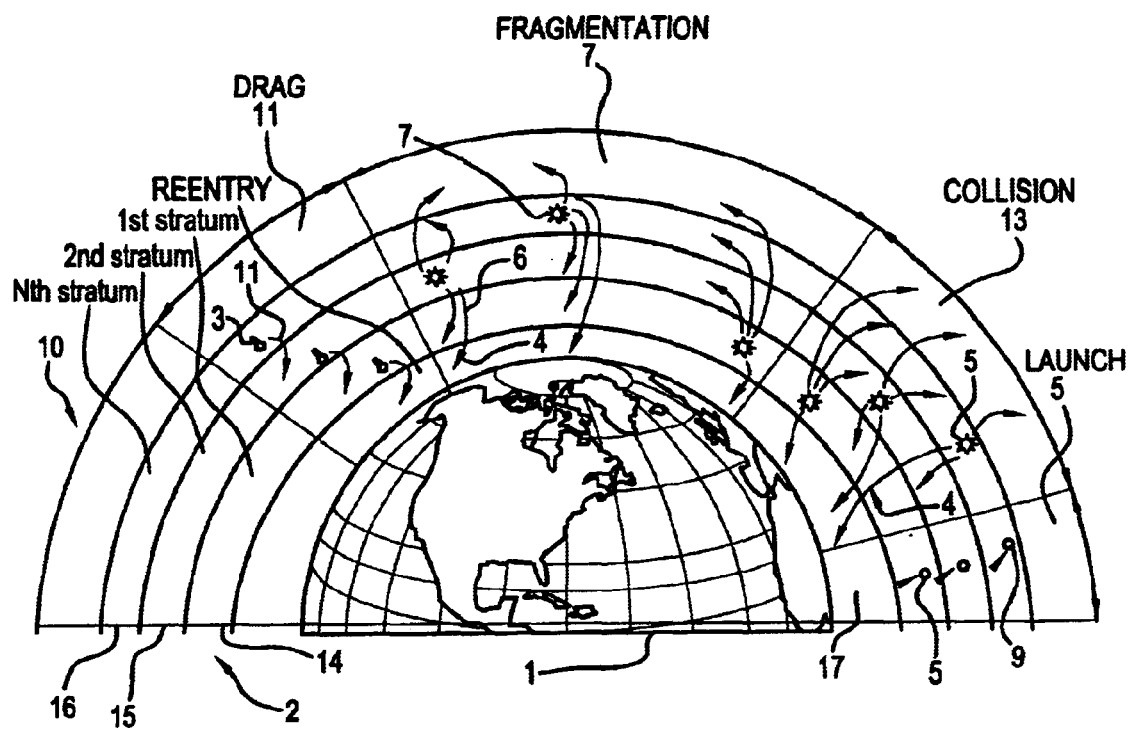
FIG. 1 is a schematic of a three-size, three-stratum PIB model.

FIG. 1 is an illustration of code characteristics:
1. The Earth
2. Low-Earth orbit region divided into altitude strata (in this example, 1 to 3)
3. Objects launched into orbit
4. Objects fragmenting on orbit
5. Objects colliding on orbit
6. Objects losing altitude due to drag FIG. 1 is a schematic of a three-size, three-stratum PIB model.

In FIG. 1, the earth is represented by numeral 1. The low-earth orbit region 2 is divided into altitude strata 14, 15 and 16 (in this example three). Objects 3 are launched into orbit. Objects 4 are caused by fragmenting on orbit. Objects 4 are caused by colliding 5 on orbit. Some objects 4 are losing altitude 6 due to drag 11.

A schematic illustration of the melded three-size, three-strata model 10 is shown in FIG. 1, showing the possible mechanisms that can influence the environment population. There are annual launches 5 from Earth 1 into each stratum, along with a chance of fragmentation 4 of launched objects 3. Drag effects 11 move objects from one stratum to a lower one 6, eventually causing objects to re-enter the atmosphere 17. In addition, a total of six different types of collisions 7 may occur between the particle size classes, each removing and producing large and small objects 4, respectively. All three mechanisms (deposition/fragmentation 4, drag 11, and collision 7) are modeled using phenomenological data and can cause objects to leave their stratum and enter a neighboring stratum, or exit the environment altogether. This embodiment calculates all of these interactions, while keeping track of the number of objects (in each size bin and stratum) and mass (i.e., mass conservation).

With three new working versions of the PIB model (multiple size, multiple stratum and melded models), more in-depth analysis of high-value on-orbit assets may be performed. The assets can be singular (e.g., ISS) or an array (communications satellite constellation). The model can provide probabilistic information, such as, but not limited to, flux and number of object-size-specific collisions over time in different strata.

This embodiment extends the PIB model from its original one-particle-size, one-stratum approach to multiple size classes and multiple strata. This is demonstrated with a three-size, 3-stratum model. The extensions to multiple sizes and strata are melded into one complete code. The fidelity of the model was significantly increased by increasing size and stratum resolution.

An exemplary embodiment expands further the scope of the PIB model from three size/strata to include up to seven particle sizes and six separate LEO altitude strata to study and analyze specific scenarios. This embodiment also focuses on user-specified detailed high-value asset risk assessments. High-value assets are defined as those objects, individual or collection, which represent a significant investment on the part of a space-faring agency where long-duration activities are an essential part of the usefulness of such assets.

Since the smallest particle-size bin in the above embodiment was limited to 0.4 m, more frequently expected impacts due to smaller objects could not be modeled. However, the successful modeling of collisional frequency calculated with the existing object sizes is indicative of the capabilities of the model with higher size resolution (ranging from meter-class to millimeter-class particle sizes).

The embodiment above implements three different particle sizes: sizes of approximately 2.2 meters, 0.8 meters, and 0.4 meters. These partitions essentially provided a model structure that could deal with tracked objects in the environment. TABLE 1 shows the relationship between particle size differences and number of particles. The ISS is primarily interested in collisions of object sizes of 1 cm and larger. In order to achieve this resolution approximately 5-particle size bins are needed. To address other problems including the cumulative effect of exposure to astronauts on extra-vehicular activity 7-particle size bins are needed. This allows the embodiment to model the environment in discrete steps from 1 mm to greater than meter-class particle sizes. This gives the user a robust capability of modeling all particle size regimes from small particle sizes concerning astronauts on EVA to medium and large particle sizes concerning space station, constellations, and single member satellites.

TABLE 1

Applicability of Higher-Resolution Object-Size Discretization & Modeling

| Number of Discrete Sizes | Object Size (m) | Risk Assessment Modeling Level Possible | # of Collision Terms (1 Strata) | # of Collision Terms (3 Strata) | # of Collision Terms (6 strata) |
|---|---|---|---|---|---|
| 1 | 2.2 | Environment Stability (Original-PIB Limit) | 1* | 3 | 6 |
| 2 | 0.8 | | 5 | 15 | 30 |
| 3 | 0.4 | Impacts with Cataloged Objects (Above Embodiment) | 14 | 42** | 84 |
| 4 | 0.05 | | 30 | 90 | 180 |
| 5 | 0.01 | ISS (All Potential Impact Hazards) | 55 | 165 | 330 |
| 6 | 0.003 | | 91 | 273 | 546 |
| 7 | 0.0008 | Astronaut on EVA (All Potential Impact Hazards) | 140 | 420 | 840*** |

*Original PIB
**Above Embodiment
***Exemplary Embodiment

Coding and testing the altitude strata is straightforward since the stratum-algorithm module is tested separately from the expanded-particle-size algorithm. The seven particles are looked at in 1-stratum, then 3-strata, and so forth for easy testing and evaluation. This approach allows users to easily identify and test for any anomalous occurrences before more complicated model melding is performed.

The 7-particle and 6-strata models are melded together with cross-feed terms, as was performed in the above embodiment. Because of the geometric increase in the number of terms, the melding of the models is a very complex task. At this point, the integrity of the model was painstakingly validated, calibrated, and tested. This activity represents one of the largest portions of work on the project in the above embodiment. Programming enhancement is required to handle the complicated matrix of possible interactions between particles sizes, strata, and interaction types (drag, fragmentation, collision). TABLE 2 describes the increase in cross-feed complexity relative to the original PIB modeling.

TABLE 2

RELATIVE LEVEL-OF-EFFORT COMPARISON BETWEEN PHASES

| Phase | # of Sizes | # of Strata | Collision Terms | Cross-Feed Terms |
|---|---|---|---|---|
| Original PIB | 1 | 1 | 1 | 0 |
| Above Embodiment | 3 | 3 | 42 | 27 |
| This Embodiment | 7 | 6 | 840 | 126 |

The above embodiment received an extra dimension of development as well; this was the inclusion of the solar cycle. The model of the solar cycle was simply the addition of a sinusoidal variation with an 11-year period and whose amplitude was variable from altitude strata to strata.

In this embodiment, refining the near- and long-term characteristics to be more than the simple sinusoid implemented in the above embodiment enhances the solar cycle model. Specifically, the published data of the National Oceanic and Atmospheric Administration (NOAA) is utilized, which currently maintains models of historical and near-term solar cycling effects that will carry over into the lifetime of the current high-value assets identified. Long-term models are applied to give a more refined holistic view of the environment evolution.

In this embodiment, other features are also implemented. These features mainly focus on possible mitigation measures that can be employed to change the phenomenology of the LEO environment, thus allowing studies for space-policy making. Some of these features include:

Launch-rate variation.
Operational debris limitation.
Procedures to limit explosions and breakups.
Debris removal—this option already exists, allowing for deliberate or random removal (sweeping) of debris. Enhancements to this feature for applicability to different particle sizes and strata will be performed.
Collision avoidance.
Shielding—this feature will affect the susceptibility of specific on-orbit assets to impacts. For example, critical elements of International Space Station may be shielded to reduce impact risk of impacts with smaller objects.
Others—NASA and other users of LEO will be consulted for user input involving other mitigation or modeling features to be included in the PIB.

In this embodiment, the code is developed under the strict guidance and protocols for commercializing software packages. The software is written in object-oriented code (TBD, C, C ++, Java, FORTRAN). The code is developed in a robust and modular software environment that allows ease of modifying, reusing, debugging, and etc. large complicated codes. Because the number of terms increases geometrically with the magnitude increase in altitude and particles sizes (see Equation 1, for example), the code needs to be efficient, bug-free, and user-friendly. This embodiment can be run by the user directly from software or off of the World Wide Web.

Figure 2A:
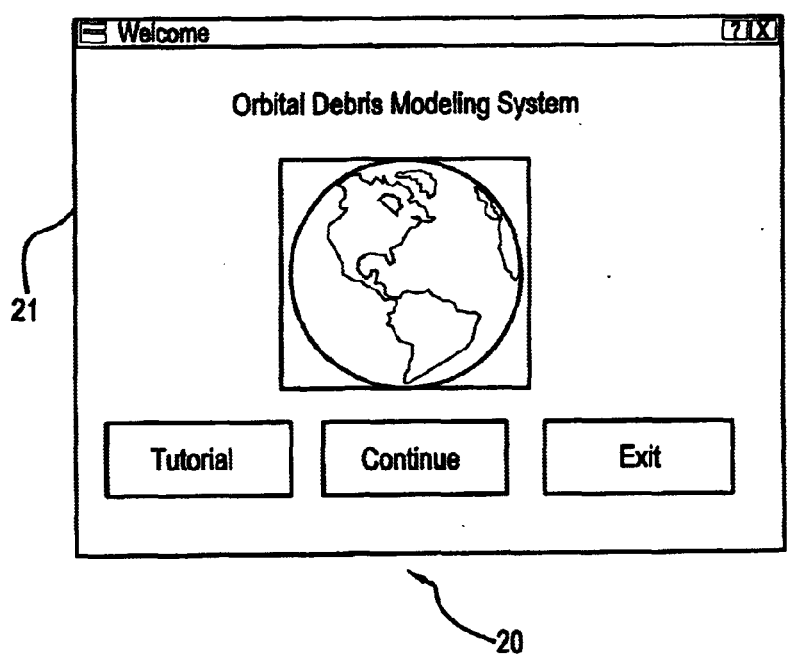
FIGS. 2A and 2B show graphical user interfaces.
Figure 2B:
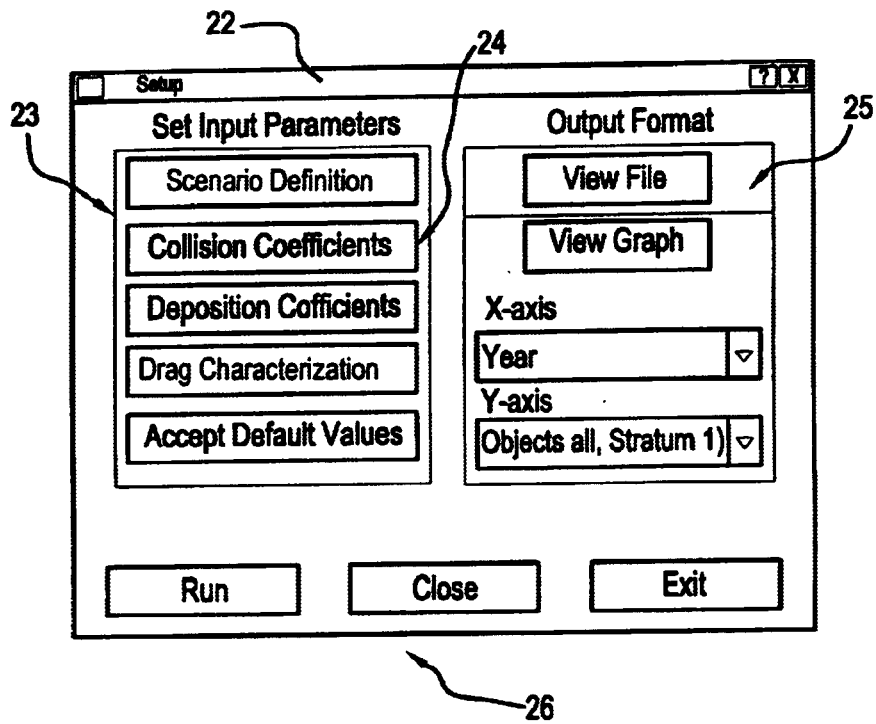

FIGS. 2A and 2B are examples of a graphical user interface:

21. Title panel
22. Main panel
23. Buttons to open sub-panels to view and edit coefficients
24. Input-coefficient panel buttons (Scenario, Collision, Deposition, Drag, Object, and Default)
25. Graphing and output options (X-Axis, Y-Axis, View File, View Plot)
26. Operation options (Run, Close, Exit)

The Graphical User Interface (GUI), FIGS. 2A and 2B, show a system 20 creates a user-friendly environment. In a "what if" situational code too many options and inputs maybe available to easily frustrate the user. Therefore, this interface is acceptable to many different classes of users. Depending on the user's needs (scenario definition), which will be identified beforehand, an appropriate GUI will be presented to the user. As with any software technology, the maturation, enhancement, and refinement are on-going processes. The code only gets better with the user's feedback and comments.

Figure 3:
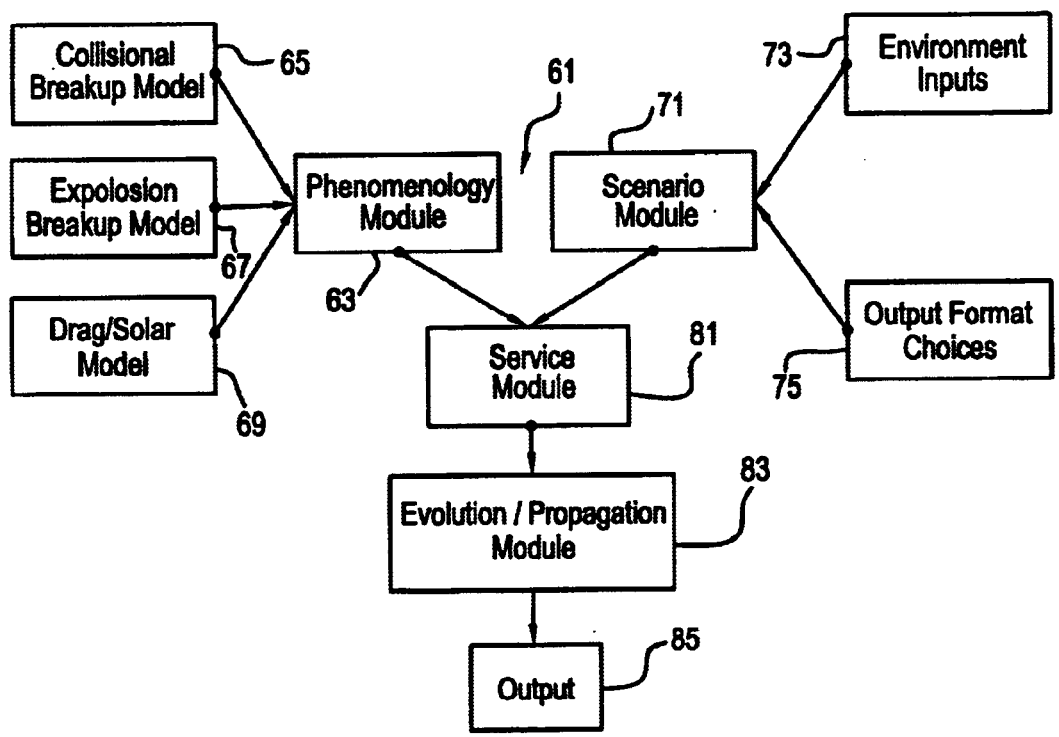
FIG. 3 is a block diagram of the system shown in FIGS. 2A and 2B.

FIG. 3 shows a block diagram of Modular Program Architecture 61. a phenomenology module 63 is supplied with inputs from a collisional breakup model 65, an explosion breakup model 67, and a drag/solar model 69. A scenario module 71 is supplied with environment inputs 73 and contains output format choices 75. Service module 81 receives inputs from the Phenomenology module 63 and the scenario module 71 and provides that information to an evolution/propagation module 83. Information output 85 is graphical or tabular.

In this embodiment, the user can initiate specific case scenarios. The case scenarios include, but are not limited to: (1) the long-term evolution of the environment; (2) the efficacy of mitigation techniques; (3) efficacy of policies, i.e., the cessation of explosions and fragmentations or the removal of large objects from orbit; (4) investigation of high-value asset scenarios; (5) constellation behavior and associated interactions; (6) environment/strata stability, including catastrophic deposition (random or deliberate, i.e., sabotage); and (7) flux and statistical hazard analysis.

As many variables that can possibly describe the future evolution of LEO pertaining to this model may be identified. The intention is to "exercise" the model with as many different combinations as possible to identify any anomalous behavior. Multiple scenario cases are generated. These models are strategically generated within specific publications to attract, and market to, the end-user community.

After enhancements were made, this embodiment was calibrated to historical records, as has been done to varying degrees in the above embodiment and the original development. In this embodiment, the 7-particle, 6-stratum model, the code was validated against highly resolved observational data available from NASA. The model was also calibrated against the entire observed environment. Further, peer review validation was sought by submitting the model for publication and/or presentation at one or more conferences (AIAA, SPIE, etc., see next task below).

To conclude, it is appropriate to highlight some of the PIB model's features, which includes, but is not limited to, the following:

1. Environmental evolution—near term and long term
2. Modeling of solar effects on the environment
3. Environment response to policy implementation and mitigation Launch rate variation Operational Debris Limitation Procedures to limit explosions and breakups Efficacy of collision-avoidance procedures
4. Mitigation Large debris removal (rocket bodies) Small debris removal (sweepers, laser removal, etc.)
5. Environment response to catastrophe Explosion and Breakups Sabotage & Warfare
6. High-value-asset concerns Collision rate—nominal Collisional rate—temporary elevation due to nearby explosions and breakups
7. International Space Station risk assessment against nominal and special environments
8. Constellation risk assessment against nominal and special environments
9. Cumulative exposure risk to astronauts on EVA The fully developed PIB, this exemplary embodiment, is the most complete and user-friendly orbital-debris risk-assessment tool available to date.

As has been pointed out, present invention uniquely provides a device that includes, but is not limited to:

1. A computer model (program or code) to assess the risk of orbital-debris impact in low-Earth orbit (LEO).
2. The model typically is applicable in the low-Earth-orbit range from 300 km to 2100 km altitude, but the range may be extended beyond these limits.
3. The numerical foundation of the model is the solution of a set of coupled differential equations.
4. The differential equations take on the form $$\dot{N}=A+BN+CN^2$$

Where: N=number of objects on orbit
$\dot{N}$=time rate of change of the number of objects
A=deposition (launch) and fragmentation coefficient
B=removal coefficient
C=collision coefficient 5. The differential equations are based on statistical thermodynamics and physics.
6. The differential equations can be solved using conventional techniques, including Euler and Runge-Kutta methods.
7. The model is phenomenologically based, meaning that historical and real data are used to determine the model's coefficients.
8. Phenomenological data is gleaned from published reports and papers and can be updated to reflect most recent or accurate information.
9. The primary physical mechanisms modeled are atmospheric drag, deposition, fragmentation and collision.
10. A sub-model is used to calculate the effect of the sun's 11-year cycle on atmospheric drag.
11. Theoretical formulations, based on experiments, can be used in the phenomenology.
12. The model is designed to be flexible so that the user can access and alter the phenomenological coefficients.
13. A graphical user interface is used to facilitate user-model interaction.
14. The model handles a range of debris sizes and altitude strata, definable by the user.
15. The user can define specific high-value assets such as: single satellite; constellation of satellites; astronaut on extra-vehicular activity; space station.
16. Output variables include, but are not limited to: number of objects; number of impacts; mass; velocity; altitude; momentum; energy; time; percentage; stability coefficients; number of breakups; target area; target cross-sectional radius.
17. Output can be graphical or textual (listing, data stream, spreadsheet, etc.).
18. The model is developed with a tutorial to describe units, coefficients, equations and description of phenomenology.
19. The model can accommodate objects whose orbit cross strata boundaries or are only a part-time inhabitant of LEO (e.g., elliptical orbits).
20. The model can calculate impact direction (the direction from which an object approaches during collision) via the suitable application of the results of orbit against orbit interaction phenomenology.

While the invention has been described with reference to specific embodiments, modifications and variations of the invention may be constructed without departing form the scope of the invention, which is described in the following claims.

We claim:

1. A method of assessing orbital impact risk, comprising:
developing theory of multiple particles and collision interaction processes of the multiple particles, dividing low Earth orbit into plural environmental strata, developing plural environmental strata code for assessing environmental risk for different stratum in the plural environmental strata, providing deposition, removal and collision coefficients for different stratum of the plural environmental strata, developing protocol for modeling of solar cycles as manifested in atmospheric drag in the different stratum of the plural environmental strata, determining particles in elliptical orbits according to time spent in the different stratum, determining in each stratum number of objects in orbit and time rate change of the number of objects in orbit, and predicting and displaying chances of collisions according to time of insertions.

2. The method of claim 1, wherein the providing collision coefficient further comprises determining number of objects created per unit time due to collision according to collision frequency and number of pieces produced by a collision.

3. The method of claim 2, wherein the collision frequency is determined from an incomplete mixing factor orbital speed at average stratum altitude, average object diameter and radii of top and bottom of stratum.

4. The method of claim 1, wherein the deposition coefficient is determined by launches per year, average number of pieces per launch, fraction of pieces within stratum, average number of pieces per fragmentation, and average fraction of pieces remaining in stratum for a year.

5. A method of assessing orbital impact risk, comprising:

developing theory of multiple particles and collision interaction processes of the multiple particles, dividing low Earth orbit into plural environmental strata, developing plural environmental strata code for assessing environmental risk for different stratum in the plural environmental strata, providing deposition, removal and collision coefficients for different stratum of the plural environmental strata, developing protocol for modeling of solar cycles as manifested in atmospheric drag in the different stratum of the plural environmental strata, determining particles in elliptical orbits according to time spent in the different stratum, determining in each stratum number of objects in orbit and time rate chance of the number of objects in orbit, predicting and displaying chances of collisions according to time of insertions, providing outputs from breakup prediction models to a phenomenological module, providing inputs from environmental information, combining the provided inputs and outputs in a service module, providing a combined input, predicting future evolution and propagation of orbital objects from the combined input, and providing an output assessing future orbital impact risk.

6. The method of claim 5, wherein the providing outputs comprises providing collisional breakup and explosion breakup model outputs.

7. The method of claim 6, wherein the providing outputs further comprises providing a drag/solar model output.

8. The method of claim 5, wherein the providing inputs further comprises providing known orbiting object environmental inputs and providing output format choices inputs.

9. Apparatus for assessing orbital collisions, comprising:

a processor, code for developing theory of multiple particles and collision interaction processes of the multiple particles, an orbital modeling system in the processor for separating Earth orbits into plural environmental strata, inputs connected to the processor for inputting existing environment of known objects in a stratum, launches per year, average number and sizes of objects per launch, numbers of objects resulting from in orbit fragmentations, and fractions of objects remaining in a stratum for a year, means for dividing low Earth orbit into the plural environmental strata, means for developing plural environmental strata code for assessing environmental risk for different stratum in the plural environmental strata, means for providing deposition, removal and collision coefficients for different stratum of the plural environmental strata, protocol for developing modeling of solar cycles as manifested in atmospheric drag in the different stratum of the plural environmental strata, means for determining particles in elliptical orbits according to time spent in the different stratum, means for determining in each stratum number of objects in orbit and time rate chance of the number of objects in orbit, and means for predicting and displaying chances of collisions according to time of insertions, inputs connected to the processor for inputting output format choices, phenomenological module inputs to the processor for inputting phenomenology in stratum output results of collision breakup models, explosion breakup models and drag and solar effect models, a service module connected to the system for interrelating the inputs, an evaluation propagation module connected to the service module for predicting orbital collisions according to inputs from the service module, and an out connected to the evaluation propagation module for outputting graphic and tabular results of the assessing orbital collisions.

* * * * *